United States Patent
Schaetzle et al.

(10) Patent No.: US 9,141,331 B2
(45) Date of Patent: Sep. 22, 2015

(54) METHOD AND DEVICE CONFIGURATION SYSTEM FOR REMOTE OPERATION OF A FIELD DEVICE

(71) Applicant: VEGA GRIESHABER KG, Wolfach (DE)

(72) Inventors: Ralf Schaetzle, Fischerbach (DE); Holger Staiger, Hardt (DE)

(73) Assignee: VEGA GRIESHABER KG, Wolfach (DE)

( * ) Notice: Subject to any disclaimer, the term of this patent is extended or adjusted under 35 U.S.C. 154(b) by 8 days.

(21) Appl. No.: 13/791,261

(22) Filed: Mar. 8, 2013

(65) Prior Publication Data

US 2013/0249775 A1   Sep. 26, 2013

Related U.S. Application Data

(60) Provisional application No. 61/705,949, filed on Sep. 26, 2012.

(30) Foreign Application Priority Data

Sep. 25, 2012 (EP) .................... 12185876

(51) Int. Cl.
*G06F 3/14* (2006.01)
*G05B 19/042* (2006.01)

(52) U.S. Cl.
CPC .......... *G06F 3/1454* (2013.01); *G05B 19/0426* (2013.01); *G05B 2219/23043* (2013.01); *G05B 2219/23079* (2013.01); *G05B 2219/23135* (2013.01); *G05B 2219/23409* (2013.01); *G05B 2219/25428* (2013.01); *G05B 2219/31131* (2013.01)

(58) Field of Classification Search
CPC .................. G06F 3/1454; G06B 2219/23079; G06B 2219/32409; G06B 2219/25428; G06B 2219/23043; G06B 2219/23135; G06B 2219/31131; G06B 19/0426
USPC ...................................... 345/2.2, 2.3
See application file for complete search history.

(56) References Cited

U.S. PATENT DOCUMENTS

2003/0114942 A1* 6/2003 Varone et al. .................. 700/83
2008/0010608 A1* 1/2008 Adams .......................... 715/781
2008/0180537 A1* 7/2008 Weinberg et al. ........ 348/211.99

FOREIGN PATENT DOCUMENTS

| WO | WO 97/04370   | 2/1997 |
| WO | WO 2004/038520 | 5/2004 |
| WO | WO 2007/032994 | 3/2007 |

OTHER PUBLICATIONS

EP 12 185 876.5 Search Report mailed Apr. 4, 2013, 9 pages—German, 4 pages—English.

* cited by examiner

*Primary Examiner* — Larry Sternbane
(74) *Attorney, Agent, or Firm* — Andrew F. Young, Esq.; Lackenbach Siegel, LLP

(57) ABSTRACT

A method and a system includes devices for remote operation of a device, especially a field device. The method may be executed on a system including a first device, especially a field device, which supplies data according to a display content, especially image data, to a second device, also a field device for visualizing the image data.

17 Claims, 2 Drawing Sheets

METHOD AND DEVICE CONFIGURATION SYSTEM FOR REMOTE OPERATION OF A FIELD DEVICE

CROSS REFERENCE TO RELATED APPLICATION

This application relates to, and claims priority from European Application Ser. No. 12 185 876.5 filed Sep. 25, 2012 and U.S. Ser. No. 61/705,949 filed Sep. 26, 2012, the entire contents of each of which are incorporated fully by reference.

FIGURE SELECTED FOR PUBLICATION

FIG. 2

BACKGROUND OF THE INVENTION

1. Field of the Invention

The present invention relates to a method and device configuration for remote operation of a device, especially a field device, a device configuration for performing such process.

2. Description of the Related Art

For field devices that are connected to a field-bus, see for example the document DE 10 2011 008 941 A1, the entire contents of which are incorporated herein by reference, the possibility exists of operating the devices remotely and thus parameterizing the devices or modifying the parameters in the device. By way of example, HART devices may be mentioned, which can be operated with a so-called HART handheld, e.g., from the Emerson company. For the field device to be operated remotely, a suitable device description database (DD (device description), FDD (field device description) must be provided or stored. The information from this device description database can then be used to parameterize the corresponding field device remotely using the HART handheld.

Alternatively it is possible—for example the document mentioned above—to parameterize a field device via a PC that, for example, is connected to the bus system by a modem. For this purpose an appropriate operating program is needed on the PC, with corresponding device drivers for the field device (e.g., PACtware™/DTM or the like).

The above-mentioned solutions have in common the fact that device description databases or drivers must be used for parameterizing remote field devices. This results in not only the general risk of possible incompatibilities, but also version dependence, so that sometimes only limited operating possibilities exist with regard to the remote field device to be parameterized. In addition, the hardware cost is also high or disadvantageous, along with the need for a storage option for the device description databases or drivers.

Starting from this, the present invention is based on the problem of overcoming the drawbacks of the prior art and suggesting a method and a device configuration by means of which remote operation of a field device is simplified and the hardware expense is reduced.

ASPECTS AND SUMMARY OF THE INVENTION

In response, at least one of the concerns noted above is resolved by the proposed invention. Advantageous further developments and embodiments are given in the dependent claims.

The method according to the invention for remote operation of a device, especially a field device, for execution with a first device, especially a field device, which supplies data according to a display content, especially image data, and a second device, especially a field device, which is designed for visualizing a display content according to the data, especially image data, and acts as a terminal, wherein the first and second devices communicate over a communication connection, is characterized by the fact that in an operating step for remote operation of the first device by the second device, in a first process step an operating action on the second device is communicated by the second device to the first device as a command and is executed by this [first device]; in a second process step, data according to a display content, which corresponds to the executed command, are transmitted from the first to the second device over the communication connection; and in a third process step, visualization of the display content of the first device according to the transmitted data takes place on the second device.

It is provided herein that process steps one to three are to be executed repeatedly within the framework of remote operation of the first device by means of the second device. In this manner even extensive operating sequences, e.g., menu-driven operating step sequences, are made possible simply and advantageously especially for parameterization.

Using the suggested method it is possible to remotely operate the first device, which for example is a sensor or transducer, especially with a (local) display/operating unit, by means of a second device, which for example is an (external) display/operating unit for a sensor, without a special device description database or a device driver for the first device being needed on the second device. This makes it possible, for example, in a (field)bus system, to parameterize similar field devices alternately each via the other. With suitable addressing, i.e., by means of a simple command set, e.g., it is also possible to operate, especially parameterize, several first (field) devices starting from a single second (field) device.

Furthermore, by transmitting the display content or data corresponding to such from the first to the second device, the possibility is established of supplying a user on the second device with the display contents needed for operating the first device, especially graphics, tabular or numerical displays, input templates, operating menus, [and] in general to visualize the operating interface of the first device on the second device without having to show the operating interface thereof as in the state of the art via a device-specific device description database. In addition, the device memories for drivers or device description databases that are required on the second device in the prior art may be advantageously dispensed with. Through the suggested method, a user can be supplied with all operating functions on the second device just as if they were local on the first device in an especially simple way if the first and second devices have similar, preferably identical input means and also preferably have a shared set of commands for performing the method.

Preferably in the process, the (entire) screen or display content displayed or generated on the first device is always transmitted to the second device in a respective operating step, i.e., in the second step of the method. As a result of particularly accurate reproduction of the display content of the first device on the second device, i.e., in the third step, a user can perform or execute an input or in general an operating action based on the display content shown on the second device, which [action] leads to a corresponding command execution on the first device within the framework of the suggested method, i.e., by transmitting a correspondingly generated command from the second device to the first.

For the remote operation of the first device and the interaction of the first and second devices, as noted above, a shared command set is provided, e.g., manufacturer-specific HART commands, which is used by the devices. By means of the commands of the specific command set, the operating actions in the first step as well as the data according to the display content can be transmitted. In this way according to the method, the first device responds to a command transmitted or communicated by the second device as if the command or the operating action had been applied directly to the first device, e.g., on a display/operating unit thereof.

Within the framework of the suggested method it is also not necessary for the first device actually to have a display. It is sufficient for the execution of the method that the first device is supplied with the data corresponding to the command executed, i.e., visualizable image information. According to the invention, the transmitted data according to the display content are preferably pixel data, also generally video memory data, i.e., data from a video memory of the first device.

The term "data" according to the display unit within the framework of the invention may also include data that, when the sequence of process steps is repeated, represent only the changes in a previously transmitted display content. It may therefore advantageously be sufficient, in the case of another execution of the second step, only to transmit data according to a display content that represent the changes in the display content (relative to a display content already displayed in a previous third step or relative to data transmitted in the second step). As was previously mentioned, transmission of the data guarantees exact reproduction of the display content of the first device on the second device. Within the framework of the data transmitted, if necessary, information may be transmitted simultaneously to the second device about the existing display properties of the first unit, i.e., format, resolution, etc.

In an embodiment of the method it is provided that the data according to the display content are requested by the second unit in a second step, especially after confirmation by the first device to the second device that it has executed the command communicated in the first step. Thus control of data flow is enabled in a simple fashion. Alternatively, it can be provided in a communication protocol that after execution of the command, i.e., in the first step, the first device independently transmits the data to the second device, i.e., in the second step, for example after sending a pilot signal.

The suggested method is preferably used for parameterizing, i.e., for remote parameterizing of the first device. For parameterization, over an operating action or the corresponding command in the first step, preferably an operating menu is opened or a menu item or entry is selected and/or generally a parameterizing input is performed. The first device is preferably a sensor within the framework of the invention, especially a flow, threshold level, pressure, filling level, or density transducer or sensor, especially with a (local) display/operating unit, or alternatively for example an actuator, and more preferably a filling level sensor, especially with a (local) display/operating unit.

Also suggested according to the invention is a device configuration with a first device, especially a field device, and a second device, especially a field device, which latter especially also acts as a terminal, wherein the device configuration is designed for executing the above described method.

In an advantageous embodiment of the device configuration, the first and the second devices are each field devices, which each in particular have a display/operating unit that is useful for performing the method. The first device is especially a sensor, especially a filling level sensor with a (local) display/operating unit, and the second device is preferably a display/operating unit for a sensor, especially a filling level sensor. In additional preferred embodiments, the second device may be a the second device may be a PC, especially with an operating tool, e.g., a mobile telephone/Smartphone, a laptop or a handheld or mobile terminal, generally e.g., an operating device with display. In a preferred embodiment, the first and second devices have similar, especially identical display/operating units, which are intended for use with the method.

Within the framework of the invention, the communication connection can be designed as hard-wired, especially by means of a field bus, or wireless, especially by means of a wireless field bus. A suitable field bus may be, for example, a HART bus, a PROFIBUS, FF or a bus system different form these; a wireless field bus may be for example, wireless HART or the like. It should be noted, however, that the invention can also utilize additional communication technologies for the communication connection, e.g., Ethernet, USB, radio, WLAN, GSM, etc. Thus a bus system is not absolutely necessary.

Preferably the device configuration or the method is used with filling level monitoring. Here the first device or field device is preferably a filling level sensor, especially with a (local) display/operating unit. Within the framework of the filling level monitoring, the field devices are also preferably in communication connection over a field bus, especially over a HART field bus.

With regard to the device configuration, additional reference is made to the description of the method, which can likewise be used for the device configuration.

Additional features and advantages of the invention will be apparent from the description of exemplified embodiments of the invention that follows, based on the figures of the drawings, which show details essential for the invention, and from the claims. The individual features can each be realized in and of itself or with others in any desired combination in a variant of the invention.

BRIEF DESCRIPTION OF THE DRAWINGS

Preferred embodiments of the invention will be explained in further detail in the following based on the attached drawings. These show.

DETAILED DESCRIPTION OF THE PREFERRED EMBODIMENTS

Figure 1:
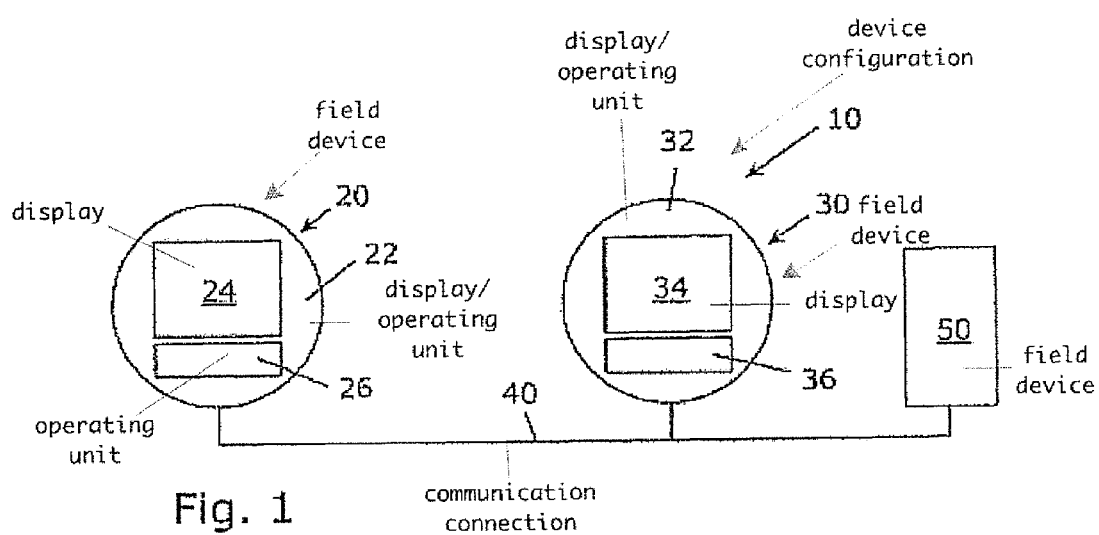
FIG. 1. By way of example and schematically, a device configuration for executing the method of the invention according to a possible embodiment of the invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent or that all aspects of a particular system described together are required and mandated. Instead, it is the claims that indicate the selected features claimed.

In the description and the drawings that follow, the same reference numbers designate elements of identical or comparable function.

FIG. 1 shows a device configuration 10 with a first device or field device 20 which is designed as a sensor with a (local) display/operating unit 22 especially for filling level measurement. Parameterization of the sensor 20 is made possible via the display/operating unit 22, wherein the display/operating unit 22 has a display 24 and an operating unit or operating element 26 for interaction with a user.

By means of the display 24, operating surfaces are visualizable especially for parameterizing the filling level sensor 20, wherein the display contents are called up through a respective operating action initiated via the operating element 26. Display contents to be output are generated in the device 20 by a graphical hardware device, especially as bit-mapped graphics, and stored in a video memory. Here the video memory is provided as a separate memory in the device 20, or alternatively this may also be part of a main memory of the device 20.

As is apparent from FIG. 1, the device configuration 10 also has a second device or field device 30, which is designed as a display or operating unit 32 and is spatially remote from the first field device 20. The display/operating unit 32, like the field device 20, has a display 34 and an operating unit or operating element 36. By means of the display 34, which is designed similarly or especially identically to that 24 of the first field device 20, display contents can be called up according to an operating action respectively initiated via the operating unit 36, which is likewise similar, especially identical to that 26 of the first field device 20. As was previously done for the field device 20, display contents to be output in the field device 30 are also generated by a graphical hardware device, especially as bit-mapped graphics, and stored in a video memory of the device 30.

Through a bidirectional communication connection 40, which is realized using a HART fieldbus, the first field device 20 is also enabled to communicate with the second field device 30. Through the bus wire 40, the field devices 20, 30, if they are HART devices, are also fed from a feed device 50.

Figure 2:
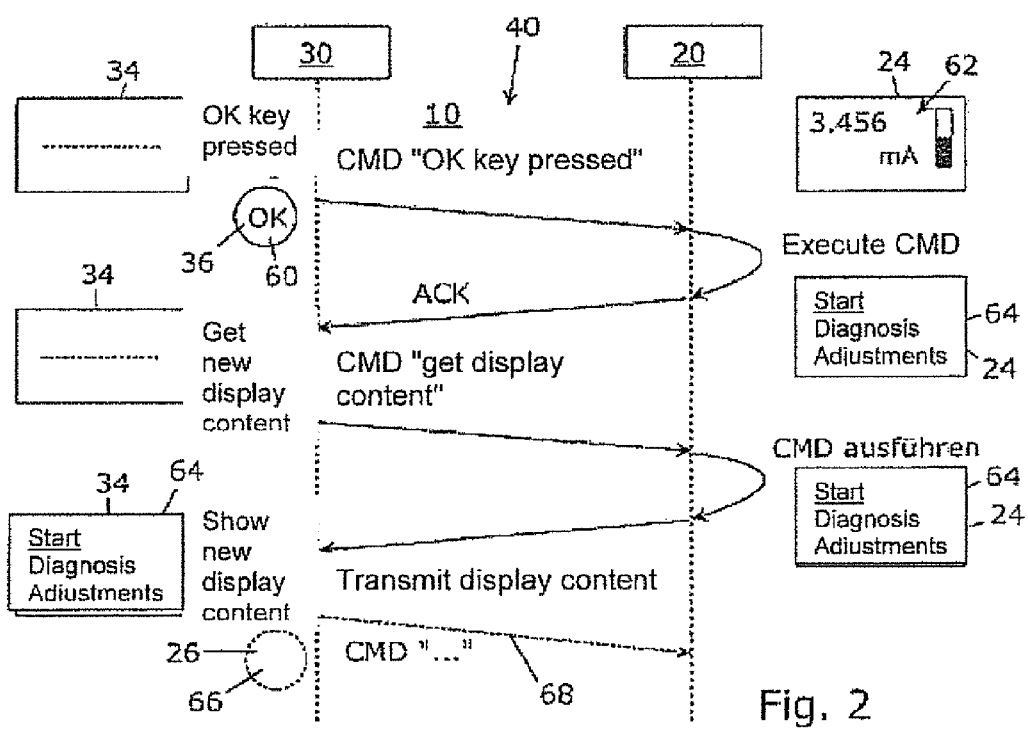
FIG. 2. By way of example and schematically, a diagram illustrating the method according to a possible embodiment of the invention.1.

To remotely operate the sensor 20 using the method according to the invention, which will be explained in detail below on the basis of FIG. 2, especially to parameterize it remotely, the second field device 30 acts as a terminal within the framework of remote operation, i.e., it is supplied or provided for a respective user interaction. It should also be noted that on the left side in FIG. 2, features of the method are illustrated with reference to the second field device 30, on the right side features are shown with reference to the first field device 20, and in the center, communications features according to the method.

In the method, during a user interaction 60 with the second device 30, for example upon pressing of an "OK" key on the operating unit 36, namely in the first step, the actuated operating action 60 on the second device 30 is communicated by the second device 30 as a command (CMD "OK key pressed") to the first device 20, i.e., the command at hand, to act upon or respond after pressing of the key 20, is communicated or transmitted to the first device 20 via the communication connection 40, and is then executed by the first field device 20 (execute CMD. Based on the command execution, in the example described, the first field device 20 changes from a measured value display, reference no. 62, to a parameterization menu 64.

In a second process step, the first field device 20 initially confirms to the second field device 30 that it has executed the communicated command, namely "OK key pressed," for which this sends an Acknowledge signal (ACK) over the communication connection 40 to the second device 30.

After receiving the ACK signal, the second device 30 in the second process step now forwards the data according to the new display content (parameterization menu 64) of the first device 20, for which purpose the second device 30 communicates a corresponding command, namely CMD "get display content," to the first device 20. During the execution of the command "get display content," the data, especially pixel data, according to the display content, currently the parameterizing menu 64, which corresponds to the executed command "OK key pressed," is read out of the video memory of the first device 20 and transmitted from the first device 20 to the second device 30 over the communication connection 40.

Based on the transmitted pixel data, in a third process step the second device 30 presents the display content 64 of the first device 20 on its own display 34, so that the called-up parameterizing menu 64 of the first device 20 can be visualized for a user on the second device 30.

Especially in the course of multiple repetition of the process steps according to the invention, a user, taking as a basis the information received through the respectively transmitted display content, can parameterize the remote device 20 on the second device 30, especially can select menu entries in the parameterization menu and perform general inputs, through suitable additional interactions, indicated by reference no. 66, with the second device 30 and corresponding commands, indicated by reference no. 68, communicated to the first device 20, and based on the attendant transmission and visualization of the display contents respectively to and on the second device 30.

For remote operation in this context, suitable HART commands (CMD) are stored in both of the field devices 20, 30, which permit data exchange in the manner shown. Finally it should be noted that by suitably addressing the first device 20 by means of the invention it is also possible to easily and advantageously operate several first field devices 20 of the type described using a single second field device 30.

Method and device configuration for carrying out the method, wherein the method is provided for remote operation of a device (20), especially a field device (20), and also is suitable for being executed with a first device (20), especially a field device (20), which supplies data according to a display content (62, 64), especially image data, a second device (30), especially a field device (30), which is suitable for visualizing a display content (62, 64) according to the data, especially image data, and acts as a terminal, wherein in an operating step for remote operation of the first device (20) by means of the second device (30), in a first step an operating action (60, 66) on the second device (30) is communicated by the second device (30) as a command (CMD, 68) to the first device (20) and is executed by this [first device], in a second process step, data according to a display content (64), which corresponds to the executed command (CMD, 68), are transmitted by the first (20) to the second (30) device over the communication connection (40), in a third process step, on the second device (30), the visualization of the display content (64) of the first device (20) takes place according to the data transmitted.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A method for remote operation of a field device, comprising the steps:
    configuring a first device to supply a display content;
    configuring a second device to visualize the display content and act as a terminal, wherein the first and the second devices communicate remotely with one another over a communication connection;
    communicating an operating action as a command (CMD) from said second device to said first device to be executed on said first device;
    transmitting said display content according to the command from said first device to said second device via the communication connection; and
    visualizing the display content transmitted from said first device on said second device,
    wherein said first device has a video memory; and
    wherein said display content is read out of the video memory of said first device,
    wherein the first device is one of a sensor for a pressure, a sensor for a filling level, a sensor for a threshold level, a sensor for a density, or a flow transducer, and wherein the first device has a local display and operating unit,
    wherein the second device is a personal computer or a display operating device for a sensor, or a mobile telephone, or a smartphone, or a laptop or a handheld device, and
    wherein the first and the second device each has a respective display and control device, and
    wherein each of the respective display and control devices utilize similar operating units.

2. The method of claim 1, wherein said first and said second device are field devices, and said display content is image data.

3. The method of claim 1, wherein the steps of the method to operate remotely said first device are executed repeatedly by the second device.

4. The method of claim 1, wherein said operating action is a user input.

5. The method of claim 1, wherein the display content is requested by the second device, upon a confirmation from the first device to the second device that the command (CMD) has been executed by the first device.

6. The method of claim 1, wherein the display content is pixel data or video memory data.

7. The method of claim 1, wherein by executing said command, an operating menu is called up on the first device or a menu entry is selected by said command.

8. The method of claim 1, wherein the first and the second device share a set of commands, and upon an input on the second device an operating action in a form of a command is executed on the first device, causing a display content be transmitted from said first device to said second device.

9. The method of claim 1, wherein a method for parameterizing the first device is executed by the second device, wherein said first device is a sensor.

10. A system for remotely operating a field device, comprising:
    a first device configured to supply a display content; and
    a second device configured to visualize the display content and to act as a terminal, wherein the first and second devices communicate remotely with one another over a communication connection,
    wherein an operating action as a command is communicated from said second device to said first device to be executed on said first device;
    wherein said display content being transmitted according to the command from said first device to said second device via the communication connection; and
    wherein the display content transmitted from said first device is visualized on said second device;
    wherein said first device has a video memory; and
    wherein said display content is read out of the video memory of said first device,
    wherein the first device is one of a sensor for a pressure, a sensor for a filling level, a sensor for a threshold level, a sensor for a density, or a flow transducer, and
    wherein the first device has a local display and operating unit,
    wherein the second device is a personal computer or a display operating device for a sensor, or a mobile telephone, or a smartphone, or a laptop or a handheld device, and
    wherein the first and the second device each has a respective display and control device, and
    wherein each of the respective display and control devices utilize similar operating units.

11. The system of claim 10, wherein said first and second devices are field devices.

12. The system of claim 10, further comprising a field bus configured to support the communication connection, and wherein the field bus is selected from the group consisting of a hard-wired field bus and a wireless field bus.

13. The system of claim 10, wherein the system monitors a filling level.

14. The system of claim 10, wherein said command includes a set of parameters for said first device.

15. The system of claim 10, wherein the command includes a menu driven set of operating instruction sequences.

16. The system of claim 10, wherein said first and said second device include a shared set of commands.

17. The system of claim 10, wherein said first and said second devices are configured to operate with a manufacturer-specific set of commands.

* * * * *